United States Patent Office 3,103,537
Patented Sept. 10, 1963

3,103,537
BORON COMPOUNDS
Alfred J. Rutkowski, Elizabeth, N.J., assignor to Esso Research and Engineering Company, a corporation of Delaware
No Drawing. Filed Sept. 23, 1958, Ser. No. 762,700
11 Claims. (Cl. 260—606.5)

This invention relates to the preparation of novel organo borane polymers. More specifically, this invention relates to the preparation of novel polyorgano boranes in which the ratio of hydrocarbon radicals to boron atoms is less than three, and no more than an average of one boron-hydrogen bond per boron atom.

It is well known that various organo borane compounds such as the boron trialkyls, boron alkyl hydrides, boron triaryls, boron aryl hydrides, boron triarylalkyls, boron trialkylaryls and other organo boranes having the same or mixed hydrocarbon radicals are suitable as fuel additives, rocket fuels and for other purposes. Compounds having boron-hydrogen bonds are also desirable in many cases; however, compounds such as diborane, dimethyl boron hydride and the like are not only unstable, but are usually very toxic as well as being difficult to handle. It is an object of this invention to provide novel polymeric compounds which are suitable as fuels and fuel additives which comprise liquid, semisolid or solid polymeric boron compounds containing a relatively low ratio of hydrocarbon radical per boron atom, i.e. less than 3/1, with no more than about one boron-hydrogen bond per boron atom. In a preferred embodiment the polymer of this invention will contain less than one boron-hydrogen bond per boron atom and preferably substantially no boron-hydrogen bonds.

Prior art organo boranes such as the boron trialkyls and boron triaryls contain three hydrocarbon radicals per boron atom.

This invention provides a polyorgano borane having from about 1 to 1.5 hydrocarbon radicals per boron atom with no more than about 1 boron-hydrogen bond per boron atom. It is a further object of this invention to produce a novel fuel suitable as a gasoline additive or as a rocket fuel per se which may be in the form of a heavy liquid, semisolid, plastic or solid state to provide a compound capable of being handled with relative ease.

It has now been discovered that a boron hydride such as diborane may be reacted in certain mole ratios with a polyolefin to produce a polyorgano borane having a ratio of 1 to 1.5 hydrocarbon radicals per boron atom with a relatively small number of boron-hydrogen bonds, i.e. no more than one per boron atom. The polyorgano borane of this invention may be typified by the following general formula:

(1)     $(R-\underset{\underset{Y}{|}}{B}-)_n R'$ wherein R represents a hydrocarbon radical having at least 3 carbon atoms; R' represents a terminal group which may be hydrogen, a saturated hydrocarbon radical, an unsaturated hydrocarbon radical, an alkoxyl radical or a hydroxyl radical. The unsaturated hydrocarbon radical may be joined with another unsaturated hydrocarbon radical by a boron atom to form a cyclic terminal radical. Y represents hydrogen, hydrocarbon, alkoxy, hydroxy or

and $n$ represents an integer from 2 to 200. Thus, when R and R' are hydrocarbon radicals and Y represents

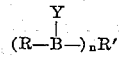

a segment of the polymeric structure may be represented by the following formula:

(2)

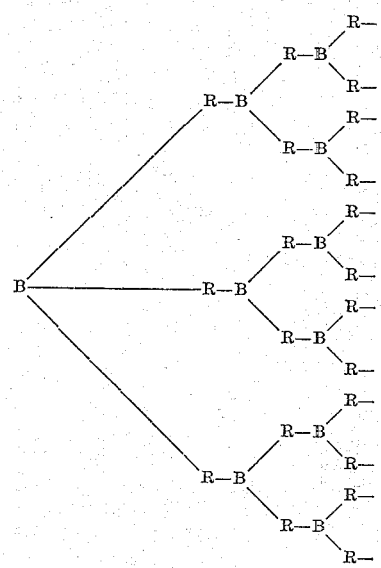

when all of the Y's represent hydrogen atoms, the structure of the polymer may appear as typified by the following formula:

(3)     $-\underset{\underset{H}{|}}{B}-R-\underset{\underset{H}{|}}{B}-R-\underset{\underset{H}{|}}{B}-R$ In Formula No. 2 it will be noted that each boron atom shares 3 hydrocarbon radicals with 3 other boron atoms, an overall ratio of hydrocarbon radicals to boron atom of 1½ to 1. In Formula No. 3 this ratio is 1/1 and of course some hydrogen atoms may displace some of the R's in Formula No. 2 to effect a ratio of hydrocarbon radical to boron atom somewhere between 1½ to 1 and 1 to 1. All of the polymeric compounds within the scope of this invention have in common the following radical:

(4)     $>B-R-B<$

A low molecular weight polyorgano borane may be prepared by reacting two moles of a dialkyl boron mono hydride with one mole of diolefin in accordance with the following equation:

(5)     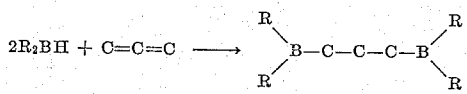

wherein R is a hydrocarbon radical.

To effect the highest ratio of hydrocarbon radicals to boron atoms within the scope of this invention, it is preferred to employ at least 1½ moles of hydrocarbon reactant per boron atom in the boron hydride reactant. Thus, with diborane a mole ratio of diolefin reactant to diborane of at least 3 to 1 would be employed. With tetraborane a ratio of 6 moles of diolefin per mole of tetraborane would be employed. If it is desired to produce a compound more linear in structure and containing some boron to hydrogen atoms, a ratio less than 1½ moles of hydrocarbon reactant per boron atom in the reactant would be employed. Thus, stoichiometric amounts required to synthesize the polymer of Formula No. 3 are a ratio of 1 mole of hydrocarbon reactant per boron atom in the borane reactant or, as an example, 2 moles of diolefin reactant per mole of diborane.

In accordance with this invention any boron hydride reactant may be employed; however, inorganic boranes are preferred. The term "an inorganic borane" as employed herein is intended to include any compound consisting of boron and hydrogen atoms, typified by such compounds as diborane, $B_2H_6$, tetraborane, $B_4H_{10}$, pentaborane, $B_5H_{11}$, pentaborane $B_5H_9$, and decaborane $B_{10}H_{14}$. As the polyolefinic reactant there is preferably employed an aliphatic diolefin such as propadiene, butadiene, isoprene, piperylene, pentadiene 1–4, 2,3 dimethyl butadiene 1–4, hexadiene, and heptadiene, e.g. $C_3$ to $C_{20}$. Cyclic diolefins such as cyclopentadiene, methylcyclopentadiene, cyclohexadiene, cycloheptadiene, cyclooctadiene and cyclononadiene, e.g. $C_5$ to $C_{20}$ are also suitable as well as less saturated hydrocarbons such as the acetylenes, e.g. acetylene, methyl acetylene, ethyl acetylene, etc. Aromatic diolefins such as divinylbenzene, diallylbenzene, etc. are also suitable. Suitable polyolefinic reactants also include aliphatic trienes, tetraenes etc. such as hexatriene, heptatriene, e.g. $C_6$ to $C_{20}$, octatetraene, nonatetraene e.g. $C_8$ to $C_{20}$, as well as cyclic trienes, tetraenes etc. such as fulvene, cyclododecatriene, e.g. $C_6$ to $C_{20}$, cyclooctatetraene e.g. $C_8$ to $C_{20}$. The particular diolefin selected is not critical with regard to the formation of the polyorgano borane polymer; however, it will affect the properties of the compound. Where it is desired to have a relatively low ratio of carbon atoms to boron atoms, it will of course be preferable to employ the lower molecular weight diolefins such as propadiene and butadiene. Where a high ratio of carbon to boron atom is desired, higher molecular weight polyolefins may be employed. It is possible to employ mixtures of polyolefins as well as mixtures of borane reactants. In accordance with another embodiment of this invention there may be employed organo boron hydrides such as boron alkyl dihydride, i.e. boron ethyl dihydride, to obtain different polymeric structures as typified in the following equation:

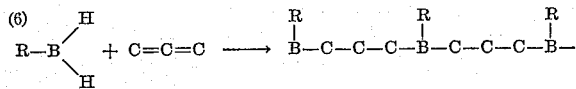

The reaction of the polyolefinic compound with the boron hydride may be carried out at temperatures from ambient to 250° C. If desired, atmospheric pressure may be employed or to speed up the reaction, increased pressures up to about 4000 p.s.i.g. may be utilized. The upper limits with regard to temperature and pressure will be dictated by the stability of the reactants and product obtained. Care must be taken not to carry out the reaction at temperatures at which the reaction mixture is explosive or unstable. If the boron hydride is a gas, it may be bubbled through the liquid polyolefin or contacted therewith by any conventional technique suitable for vapor-liquid or vapor-vapor reactions.

If desired, an inert solvent may be employed. Suitable solvents comprise the various well-known oxygenated solvents such as ethyl ether, tetrahydrofuran, diethylene glycol dimethyl ether or the like. Also there may be employed hydrocarbon solvents such as pentane, heptane etc. as well as such aromatic type solvents as benzene, toluene, xylene etc., provided that at least a trace amount of an ether type solvent, as listed above, is present. It is also necessary to maintain an inert atmosphere above the reaction mixture and to maintain anhydrous conditions. Dry nitrogen is suitable for this purpose as well as any other inert gas.

To demonstrate the invention with more particularity, reference may be had to the following examples:

Example 1

1.2 moles of diborane produced by reacting 1.9 moles of sodium borohydride with 2.4 moles of boron trifluoride etherate in a two liter flask in accordance with known techniques was passed through a one liter flask containing 210 grams (3 moles) of piperylene dissolved in 1 lb. of anhydrous ether at room temperatures under atmospheric pressures. A slow stream of nitrogen was also allowed to pass through the mixture. The diborane gas was passed through the piperylene for a period of 8 hours during which time the temperature rose from 25° to 40° C. At the end of the reaction after 8 hours, methanol was added to the reaction mixture to decompose excess diborane, a toxic gas. The ether and methanol were then distilled off and the residue was distilled under reduced pressures (0.1 to 0.05 millimeters mercury) to give 83.8 grams of a light by-product material and 118.8 grams of a semisolid polymer of boron, carbon and hydrogen. The polymeric yield was calculated to be 53.2%. The boiling range of the light by-product material was 48° to 62° C. at 0.1–0.05 millimeters mercury. Boron analyses of the semisolid polymer showed 10.27% boron. The theoretical boron for this polymer with no boron to hydrogen bonds is 9.33%. Theoretical for one boron to hydrogen bond per boron atom is about 15.7%. A molecular weight of 360 was obtained for the semisolid polymer.

Example 2

Apparatus and reagents used were the same as in Example 1. The procedure was the same except methanol was not added to the piperylene-diborane reaction flask. The ether was removed and the residue distilled under reduced pressure. From the distillation was obtained 59.3 grams, 26.5% yield of a boron-carbon-hydrogen polymer which was a solid at room temperature and 138 grams 61.5% yield of lighter boiling material (54–98° C. at 0.6–0.02 mm.). By analyses the boron content in the polymer was 10.74%. A molecular weight of 471 was obtained for the solid material.

Example 3

Isoprene in 50 ml. of anhydrous ether was reacted with diborane under similar conditions to Example 1 with a molar ratio of isoprene to diborane of 3 to 1. There was recovered a 32% yield of a semisolid polyorgano borane. A molecular weight of 328 was obtained for the semisolid material.

Example 4

1.5 moles of cyclopentadiene dissolved in one pound of anhydrous ether was reacted with 0.3 moles of diborane at 0 p.s.i.g. and at temperatures of 2° to 5° C. and there was obtained a solid polymer in 35.9% yield and a semisolid polymer in 45.9% yield.

Example 5

1.2 moles of propadiene dissolved in anhydrous ether and kept at −50° C. is reacted with 0.4 mole of diborane. The temperature is maintained by a Dry-Ice heptane bath with a Dry-Ice heptane condenser also being used to prevent losses of propadiene. After removal of the ether by distillation, a solid or semisolid product is obtained.

Example 6

1.2 moles of cyclohexadiene which is dissolved in heptane and a trace (5–10 ml.) of ether is added, is reacted with 0.4 mole of diborane. Essentially ambient temperatures are used. After removal of the solvents a solid or semisolid material is obtained.

Example 7

0.6 mole of divinylbenzene dissolved in anhydrous ether is reacted with 0.2 mole of diborane. Essentially ambient temperatures are used. After removal of the ether a solid or semisolid material is obtained.

Example 8

1.2 moles of butadiene dissolved in anhydrous ether and kept at −30° C. is reacted with 0.4 mole of diborane. The temperature is maintained by a Dry-Ice heptane bath with a Dry-Ice heptane condenser used to prevent loss of butadiene. After removal of the ether a solid or semisolid material is obtained.

Example 9

1 mole of butadiene dissolved in anhydrous ether and kept at −30° C. as in Example 8 is reacted with 0.25 mole of dibutyl diborane. After removal of the ether a solid or semisolid material is obtained.

Example 10

1 mole of pentadiene-1,4 dissolved in anhydrous ether is reacted with 1 mole of tetrabutyl diborane. Essentially ambient temperatures are used. After removal of the solvent only a liquid product is obtained.

Example 11

A mixture of 0.6 mole piperylene and 0.6 mole of cycloheptadiene, dissolved in ether, is reacted with 0.4 mole of diborane. Essentially ambient temperatures are used. After removal of the solvent a solid or semisolid material is obtained.

Example 12

1 mole of cyclododecatriene-1,5,9 dissolved in ether is reacted with 0.5 mole of diborane. Essentially ambient temperatures are used. After removal of the ether a solid or semisolid material is obtained.

It will be noted from the above examples that the diolefinic compound may be aliphatic or cyclic and that no criticality resides in the particular diolefinic reactant. While the unsubstituted boron hydrides are preferred as has been shown in the specific examples, there may also be employed organo substituted boranes having at least one boron to hydrogen atom.

What is claimed is:

1. A process for the preparation of an organo borane polymer having a viscosity in the range of solid to semisolid, which comprises reacting a boron hydride having from 2–10 boron atoms with a diolefin in a mole ratio of diolefin to boron atoms in said boron hydride of greater than 1:1 to obtain an organo borane polymer having less than one boron-hydrogen bond per boron atom in said polymer.

2. A process in accordance with claim 1 wherein the mole ratio of diolefin to boron atoms in said boron hydride is about 1.5/1 to obtain an organo borane polymer having essentially no boron-hydrogen bonds.

3. A process in accordance with claim 1 wherein said diolefin is piperylene.

4. A process in accordance with claim 1 wherein said diolefin is isoprene.

5. A process in accordance with claim 1 wherein said diolefin is cyclopentadiene.

6. A process for the preparation of an organo borane polymer having a viscosity in the range of solid to semisolid, which comprises reacting a boron hydride having from 2–10 boron atoms at temperatures from ambient to 250° C. and pressures from atmospheric to 4000 p.s.i.g., with a diolefin in a mole ratio of diolefin to boron atoms in said boron hydride of greater than 1:1 to obtain an organo borane polymer having less than one boron hydrogen bond per boron atom in said polymer.

7. A process in accordance with claim 6 wherein said diolefin is selected from the group consisting of piperylene. isoprene, cyclopentadiene, propadiene, and butadiene.

8. A process in accordance with claim 6 wherein said diolefin is piperylene.

9. A process in accordance with claim 6 wherein said diolefin is isoprene.

10. A process in accordance with claim 6 wherein said diolefin is cyclopentadiene.

11. An organo borane polymer prepared in accordance with the process of claim 5.

References Cited in the file of this patent

UNITED STATES PATENTS

| | | |
|---|---|---|
| 2,925,437 | Brown | Feb. 16, 1960 |
| 2,964,567 | Neff | Dec. 13, 1960 |
| 3,008,997 | Saegebarth | Nov. 14, 1961 |
| 3,013,083 | Lawton et al. | Dec. 12, 1961 |
| 3,014,075 | Saegebarth | Dec. 19, 1961 |

OTHER REFERENCES

Stone et al.: J. Chem. Soc. (London), pp. 2755–9 (1950).

Parsons et al.: J. Am. Chem. Soc., vol. 76, p. 1710 (1954).

Schlesinger et al.: Current Literature Abstracts Bulletin, vol. 6, pp. 316–7 (1957).